United States Patent [19]
Ootsuka

[11] Patent Number: 5,796,709
[45] Date of Patent: Aug. 18, 1998

[54] DISK REPRODUCTING APPARATUS HAVING IMPROVED CONNECTION BETWEEN THE CENTERING MEMBER AND TURNTABLE

[75] Inventor: Makoto Ootsuka, Yokohama, Japan

[73] Assignee: Kabushiki Kaisha Toshiba, Kawasaki, Japan

[21] Appl. No.: 538,940

[22] Filed: Oct. 4, 1995

[30] Foreign Application Priority Data

Oct. 4, 1994 [JP] Japan ............... 6-240434

[51] Int. Cl.⁶ .................... G11B 23/00; G11B 25/04
[52] U.S. Cl. ................................................ 369/271
[58] Field of Search ........................ 369/264, 270, 369/271; 360/99.05, 99.12

[56] References Cited

U.S. PATENT DOCUMENTS

| | | | |
|---|---|---|---|
| 4,432,086 | 2/1984 | Hughes | 369/269 |
| 4,539,614 | 9/1985 | Thompson | 369/270 |
| 4,731,779 | 3/1988 | Mathunaga | 369/270 |
| 4,787,079 | 11/1988 | Ueno | 369/270 |
| 4,829,510 | 5/1989 | Takahashi | 369/290 |
| 4,847,826 | 7/1989 | Sakaguchi et al. | 369/270 |
| 5,177,731 | 1/1993 | Tanaka et al. | 369/270 |
| 5,228,023 | 7/1993 | Hartog | 369/263 |
| 5,457,676 | 10/1995 | Park | 369/270 |
| 5,501,760 | 3/1996 | Mukawa | 369/270 |

FOREIGN PATENT DOCUMENTS

| | | | |
|---|---|---|---|
| 3-16045 | 1/1991 | Japan | 369/270 |
| 03283071 | 12/1991 | Japan | 369/270 |

Primary Examiner—Stuart S. Levy
Assistant Examiner—George J. Letscher
Attorney, Agent, or Firm—Cushman Darby & Cushman IP Group of Pillsbury Madison & Sutro LLP

[57] ABSTRACT

A disc reproducing apparatus is disclosed, that comprises a turn table for holding and rotating a disc, a motor for driving the turn table, a centering member for fitting a center hole of the disc so as to align the disc to the center of the turn table, a plurality of protrusion portions formed around the centering member and protrudes along the surface of the disc, a plurality of hole portions formed on the surface of the turn table so that the protrusion portions are simultaneously inserted into the hole portions and moved about the center of the centering member for a predetermined angle, and a stopper for fitting the protrusion portions of the centering member inserted into the hole portions of the turn table and rotated so as to secure the centering member to the turn table.

5 Claims, 19 Drawing Sheets

FIG. 7A
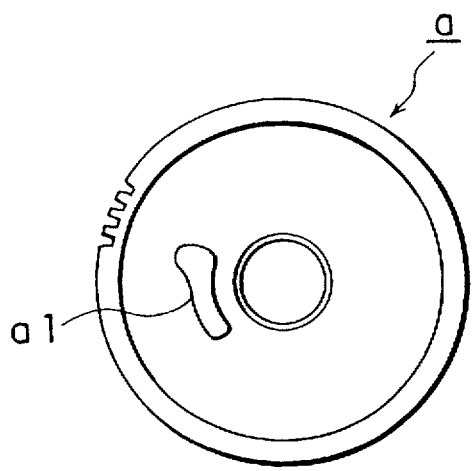
FIG. 8A
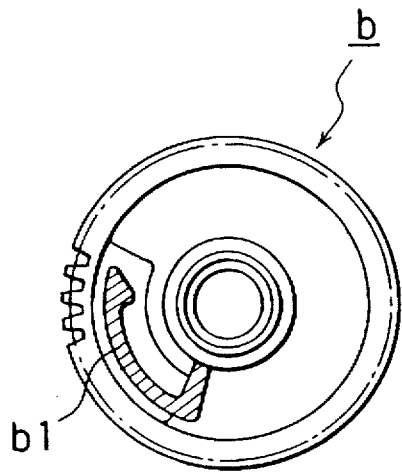
FIG. 7B
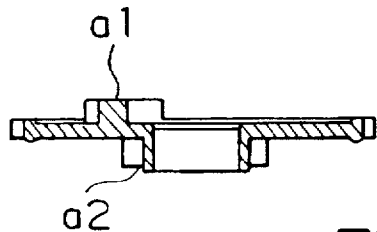
FIG. 8B
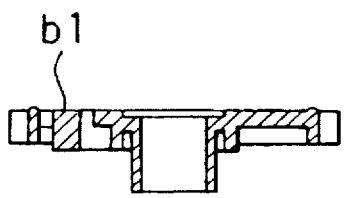
FIG. 9A
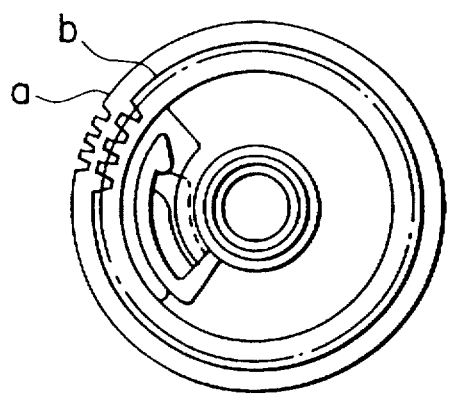
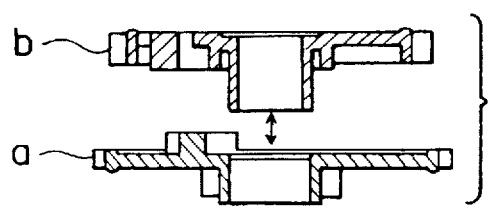
FIG. 9B

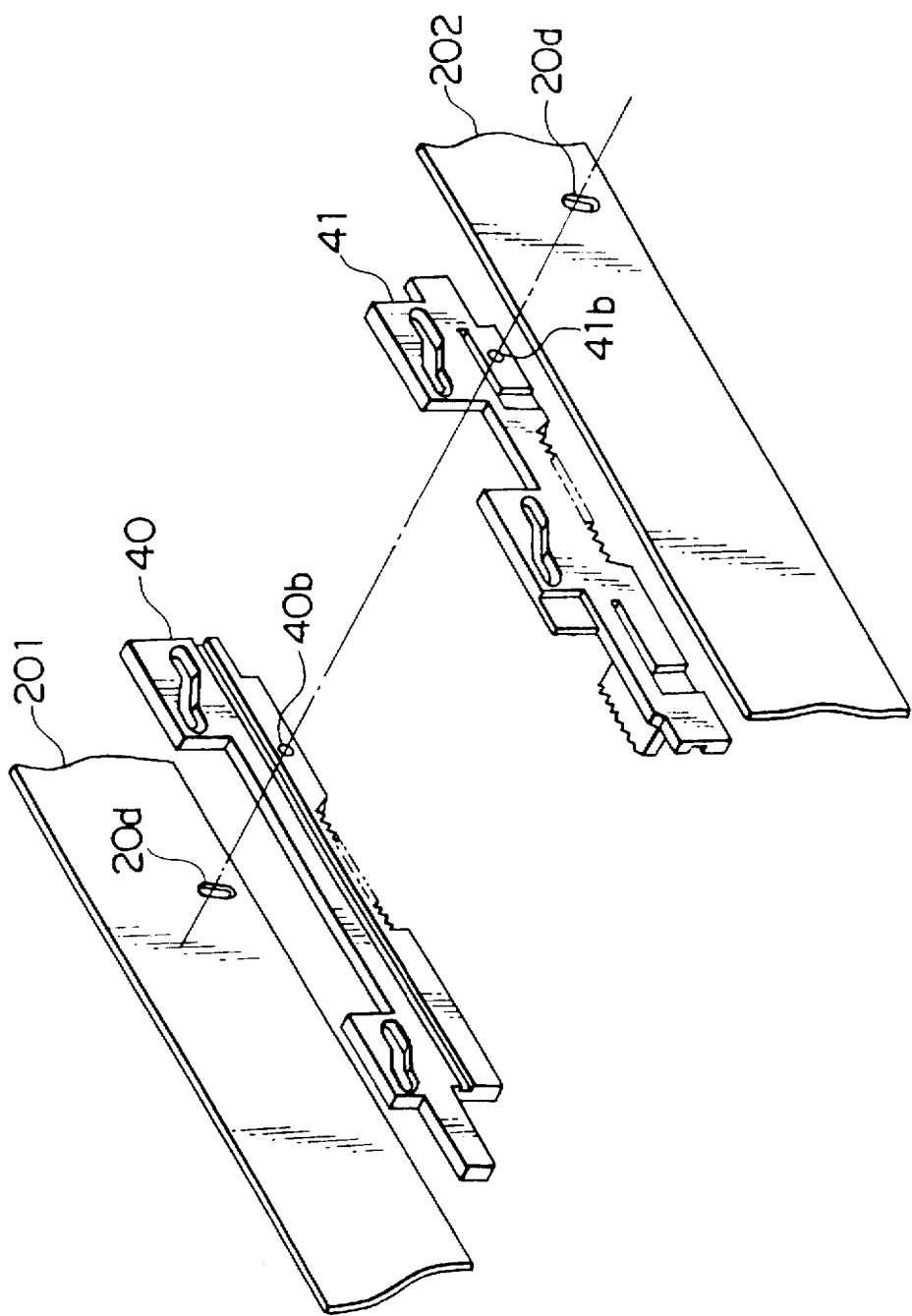

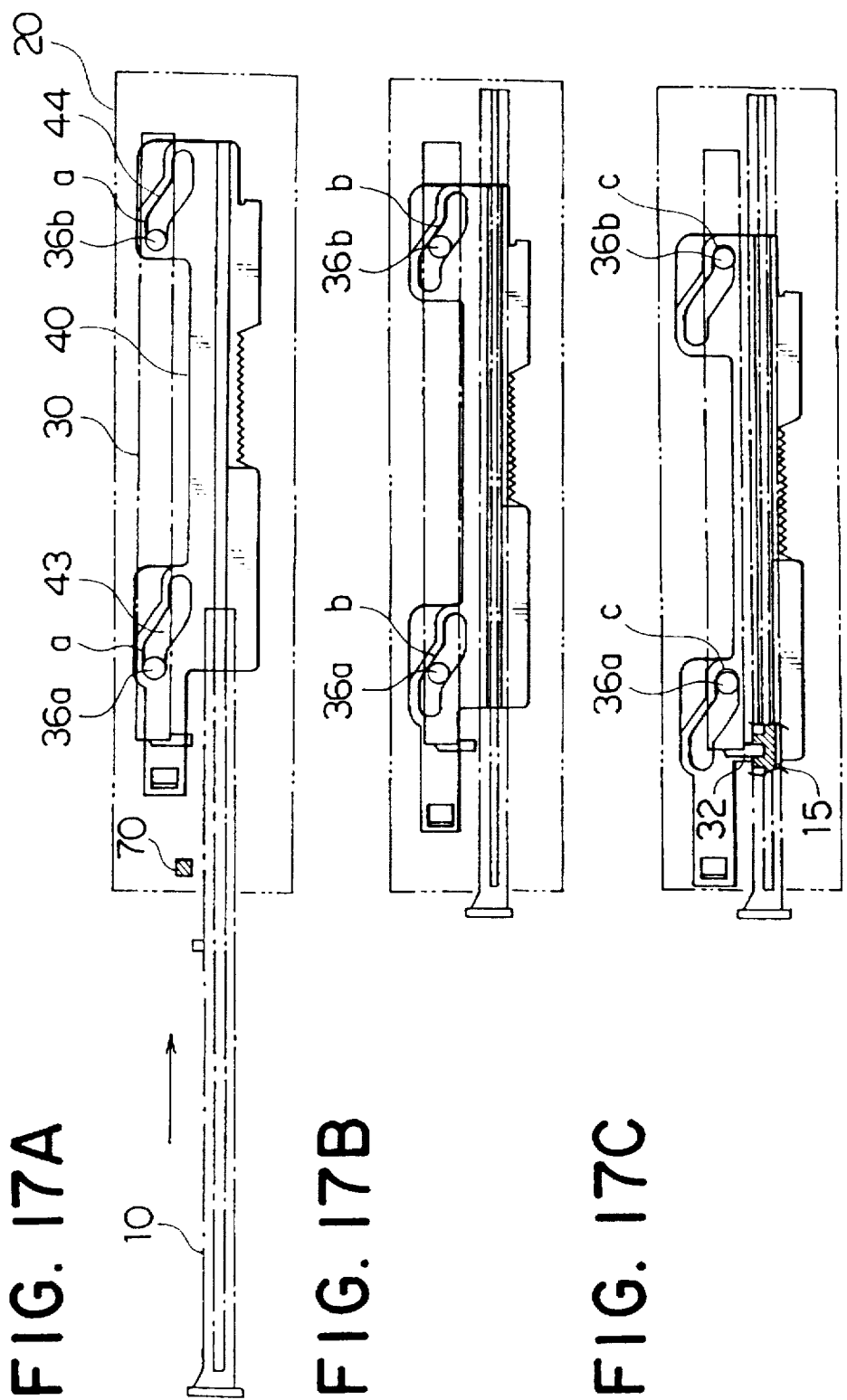

5,796,709

1

DISK REPRODUCTING APPARATUS HAVING IMPROVED CONNECTION BETWEEN THE CENTERING MEMBER AND TURNTABLE

BACKGROUND OF THE INVENTION

1. Field of the Invention

The present invention relates to a disc reproducing apparatus such as a CD-ROM drive.

2. Description of the Related Art

In recent years, disc reproducing apparatuses such as CD-ROM drives that are built in computers have been powerfully developed. In a conventional disc reproducing apparatus, a tray that holds an optical disc is horizontally (in the direction of the disc surface) loaded and unloaded to and from a cabinet that has an optical pickup, a disc drive mechanism (including a disc motor and a turn table), and so forth. Another disc reproducing apparatus has a pickup unit that is integrally constructed of an optical pickup and a disc drive mechanism and that is lifted up while the tray is being loaded and unloaded.

FIG. 22 is a sectional view showing the construction of a disc drive mechanism disposed in a pickup unit. In FIG. 22, reference numeral 91 is a disc motor. Reference numeral 92 is a motor shaft directly connected to the motor 91. Reference numeral 93 is a turn table secured to the motor shaft 92. Reference numeral 94 is a centering member that aligns an optical disc (not shown) to the center of the turn table 93. The centering member 94 is retained by a member 95 so as to prevent the centering member 94 from being pulled off the motor shaft 92. The member 95 is secured to the motor shaft 92 with a bonding agent or the like. Thus, when the centering member 94 is disposed on the turn table 93, a means for preventing the centering member 94 from being pulled off the shaft 92 is provided.

FIG. 23 is a sectional view showing another method for preventing the centering member from dropping. In this method, a plurality of nails 97 are formed at a lower portion of the centering member 96. The nails 97 are inserted into nail holes formed in the turn table 98. The nails 97 inserted into the nail holes of the turn table 98 are prevented from separating from the turn table 98 with key portions formed at edges of the nails 97.

However, in the method shown in FIG. 22, the member 95 should be bonded. Thus, the workability for assembling the member 95 is low. In addition, the member 95 causes the height of the resultant apparatus to increase. On the other hand, in the method shown in FIG. 23, to secure the centering member 96 to the turn table 98, the key portions of the nails 97 should be largely formed. However, when the key portions are largely formed, it is difficult to insert the key portions into the nail holes of the turn table 98. Thus, the workability of the method shown in FIG. 23 is low.

SUMMARY OF THE INVENTION

An object of the present invention is to provide a disc reproducing apparatus for allowing a centering member to be easily and stably secured to a turn table and allowing a disc drive mechanism including the turn table and the centering member to be thinly constructed.

The present invention is a disc reproducing apparatus, comprising a turn table for holding and rotating a disc, a motor for driving the turn table, a centering member for fitting a center hole of the disc so as to align the disc to the center of the turn table, a plurality of protrusion portions

2 formed around the centering member and protrudes along the surface of the disc, a plurality of hole portions formed on the surface of the turn table so that the protrusion portions are simultaneously inserted into the hole portions and moved about the center of the centering member for a predetermined angle, and a securing means for fitting the protrusion portions of the centering member inserted into the hole portions of the turn table and rotated so as to secure the centering member to the turn table.

Since the disc reproducing apparatus according to the present invention is constructed as described above, by inserting the centering member into the hole portion of the turn table and turning the centering member for a predetermined angle, the centering member can be easily secured to the turn table.

Thus, according to the present invention, the disc reproducing apparatus of which the disc drive mechanism can be easily assembled can be provided. In addition, according to the present invention, the disc drive mechanism can be thinly constructed more easily than the conventional disc drive mechanism.

These and other objects, features and advantages of the present invention will become more apparent in light of the following detailed description of a best mode embodiment thereof, as illustrated in the accompanying drawings.

BRIEF DESCRIPTION OF THE DRAWINGS

FIG. 7 is a top view and a sectional view showing a second gear of a clutch gear;

FIG. 8 is a top view and a sectional view showing a first gear of the clutch gear;

FIG. 9 is a top view and a sectional view showing the construction of the clutch gear;

FIG. 16 is a perspective view showing a tray loading operation;

FIGS. 17A to 17C are plan views showing the state that the tray is unloaded;

DESCRIPTION OF THE PREFERRED EMBODIMENTS

Next, with reference to the accompanying drawings, an embodiment of the present invention will be described.

Figure 1:
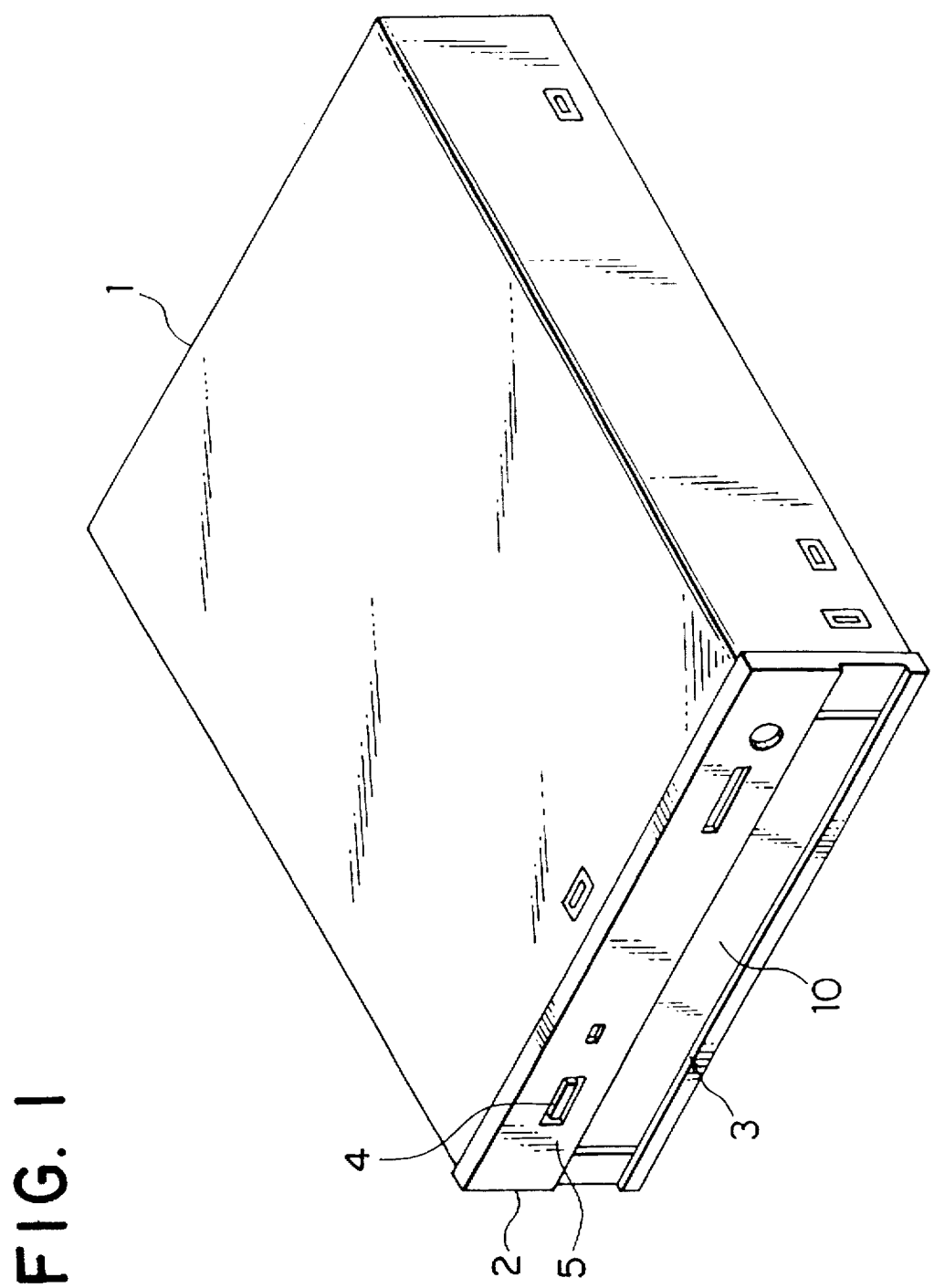
FIG. 1 is a perspective view showing an optical disc reproducing apparatus according to an embodiment of the present invention.

In FIG. 1, reference numeral 1 is a cabinet. Reference numeral 2 is a front panel. The front panel 2 has an opening portion 3, an eject switch 4, and a small hole 5. A tray 10 that holds an optical disc is loaded and unloaded to and from the opening portion 3. The eject switch 4 issues an electric command for unloading the tray 10. In case of a trouble of the tray 10, when a needle or the like is inserted into the small hole 5, the tray can be manually unloaded.

Figure 2:
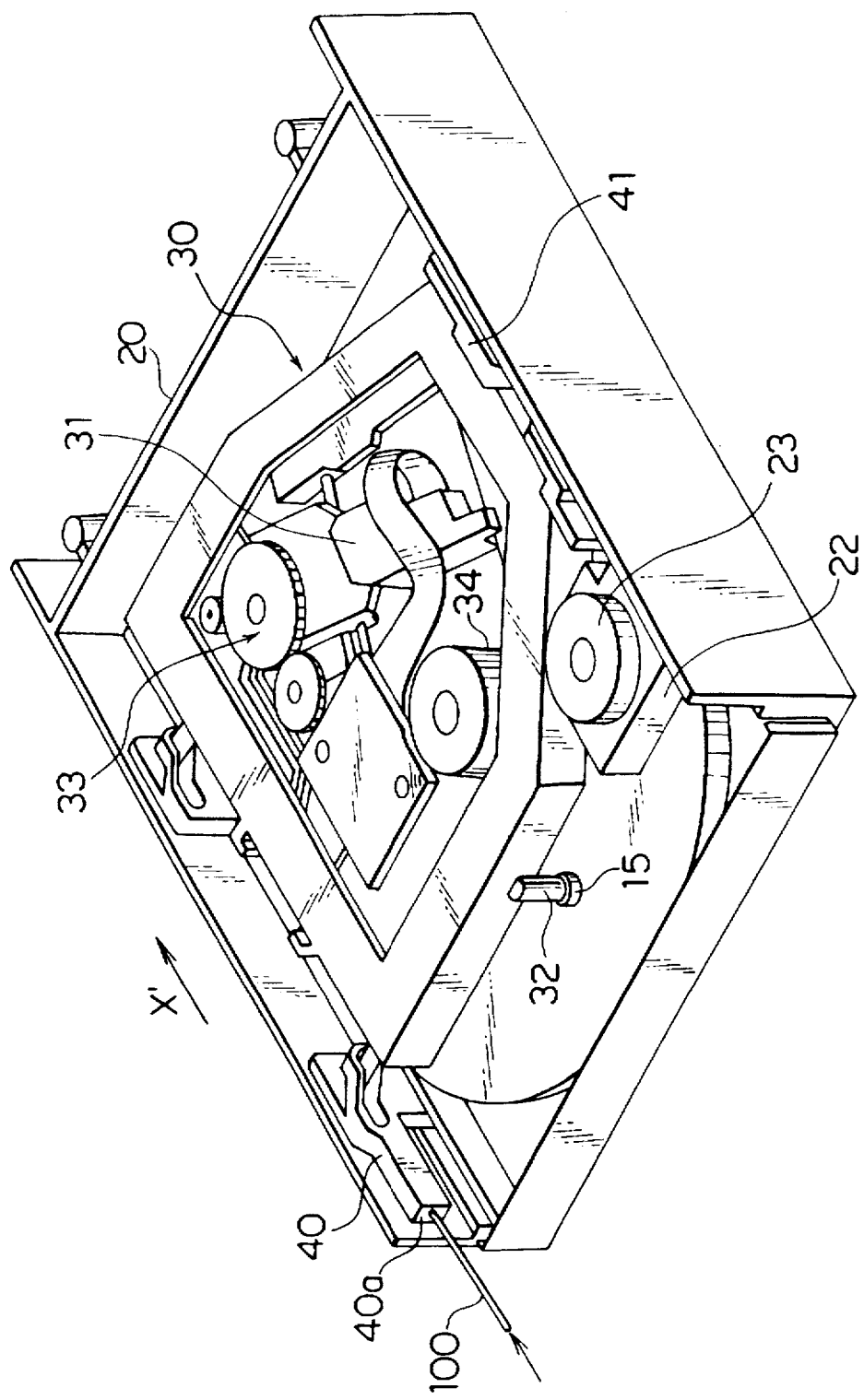
FIG. 2 is a perspective bottom view showing the inside of the optical disc reproducing apparatus shown in FIG. 1 of which a cabinet is removed.
Figure 3:
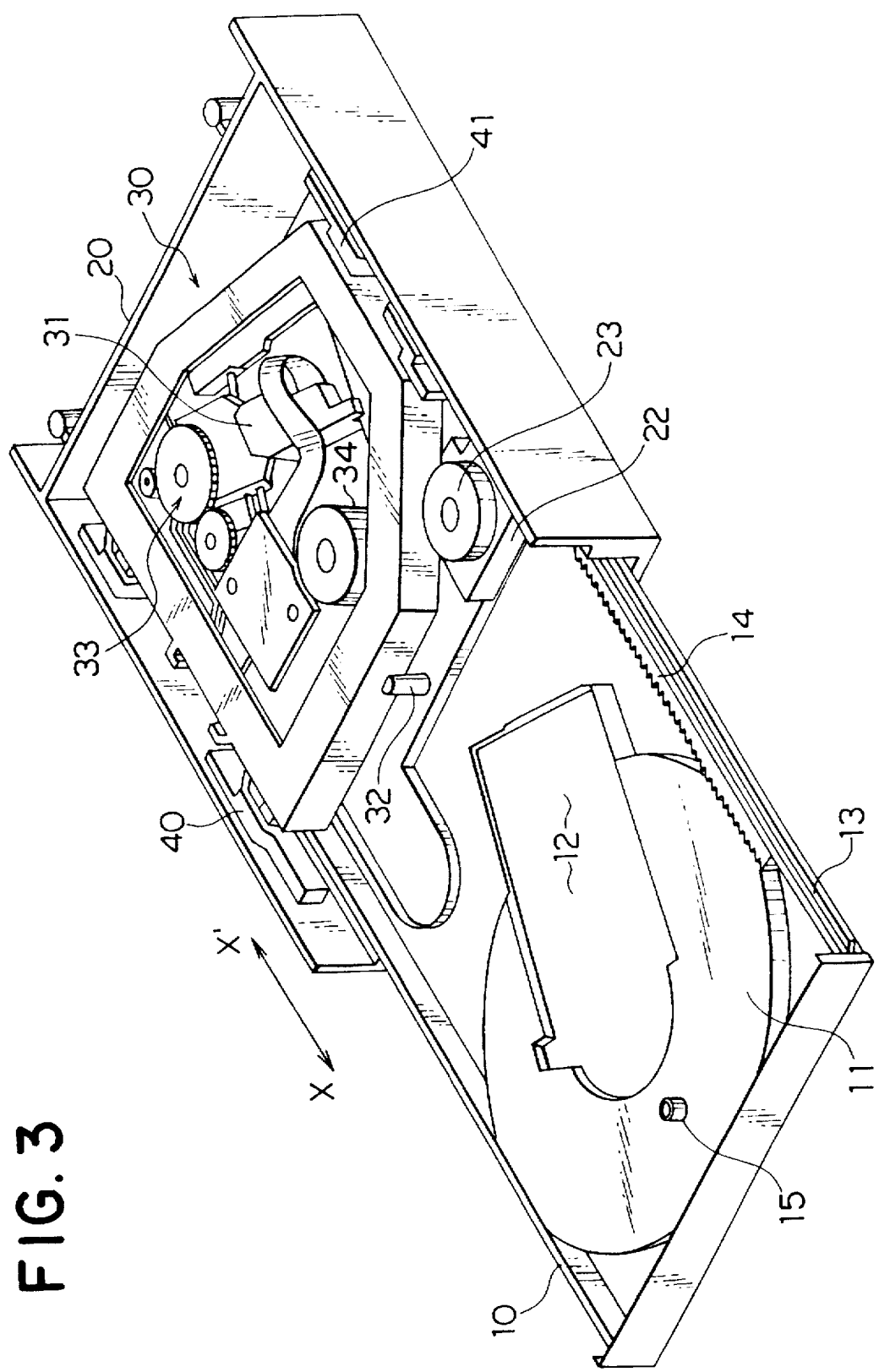
FIG. 3 is a perspective top view showing the optical disc reproducing apparatus of which the tray has been unloaded.
Figure 4:
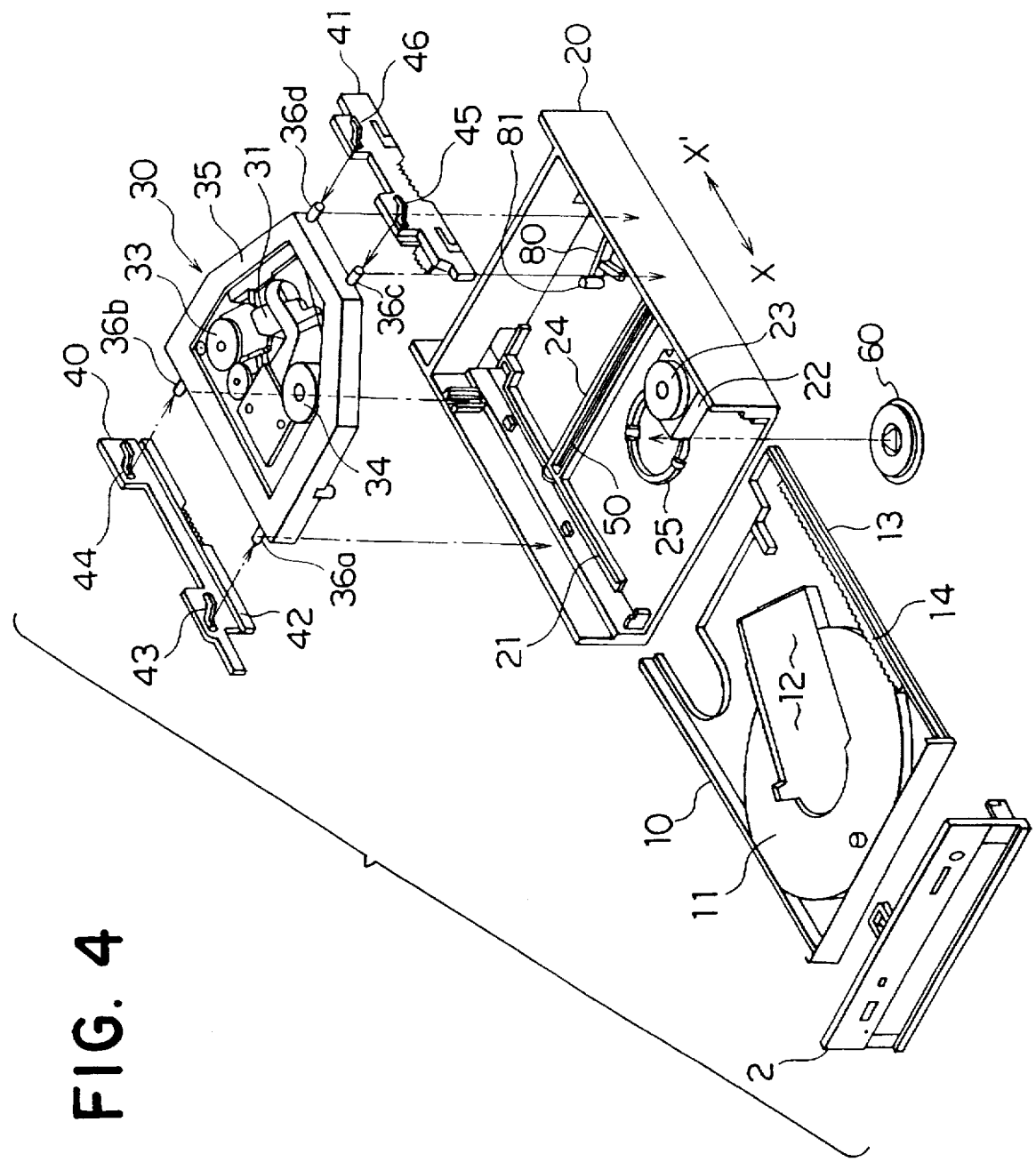
FIG. 4 is an exploded perspective top view showing the optical disc reproducing apparatus shown in FIG. 1.

In FIGS. 2, 3, and 4, reference numeral 20 is a frame composed of a mold resin. Reference numeral 30 is a pickup unit (hereinafter referred to as the PU unit). Reference numerals 40 and 41 are a pair of sliders that support and guide the tray 10 and the PU unit 30 in the frame 20.

Next, each portion of the apparatus will be described in detail.

(Detail description of frame 20)

The frame 20 comprises slider support portions 21 and 21 (that slidably support the sliders 40 and 41 in the direction of the arrow X-X'), a motor mount portion 22 (that mounts a motor 23 that is a power source for loading and unloading the tray 10), a joint member mount portion 24 (that mounts a joint member 50 (see FIG. 6) for synchronizing the sliding motions of the sliders 40 and 41), and a clamper mount portion 25 (that rotatably supports a clamper 60).

(Detail description of tray 10)

The tray 10 has a disc hold portion 11 and a window 12. The disc hold portion 11 holds an optical disc (not shown). A part of a signal record surface of the optical disc held on the disc hold portion 11 is exposed from the window 12. Slider fitting protrusions 13 and 13 are formed on the outer side surfaces of the tray 10. The slider fitting protrusions 13 and 13 fit guide grooves 42 and 42 (see FIG. 5) of the sliders 40 and 41, respectively. Thus, the tray 10 is supported on the sliders 40 and 41 so that the tray 10 is movable in the direction of the arrow X-X'. A rack gear 14 is formed on one inner side surface of the tray 10. The rack gear 14 is linked to the loading motor 23 through a plurality of gears. An aligning pin hole 15 is formed on the rear surface of the disc hold portion 11 of the tray 10. When a fixing pin 32 formed on the PU unit 30 is inserted into the pin hole 15, the tray 10 is aligned and secured to the PU unit 30.

(Detail description of PU unit 30)

The PU unit 30 comprises an optical pickup 31, a pickup moving mechanism 33, a disc drive mechanism, a frame 35, and a print wiring board. The optical pickup 31 reads an information signal from the signal record surface of the optical disc. The pickup moving mechanism 33 moves the optical pickup in the radial direction of the optical disc. The disc drive mechanism comprises a turn table and a disc motor 34 that hold and rotate the optical disc along with the clamper 60. The frame 35 integrally supports the optical pickup 31, the pickup moving mechanism 33, and the disc drive mechanism. The above-described fixing pin 32 is formed on the frame 35. Guide pins 36a, 36b, 36c, and 36d that are inserted into guide holes 43, 44, 45, and 46 formed in the sliders 40 and 41 (see FIG. 5) are formed on both the side surfaces of the frame 35.

(Detail description of sliders 40 and 41)

Figure 5:
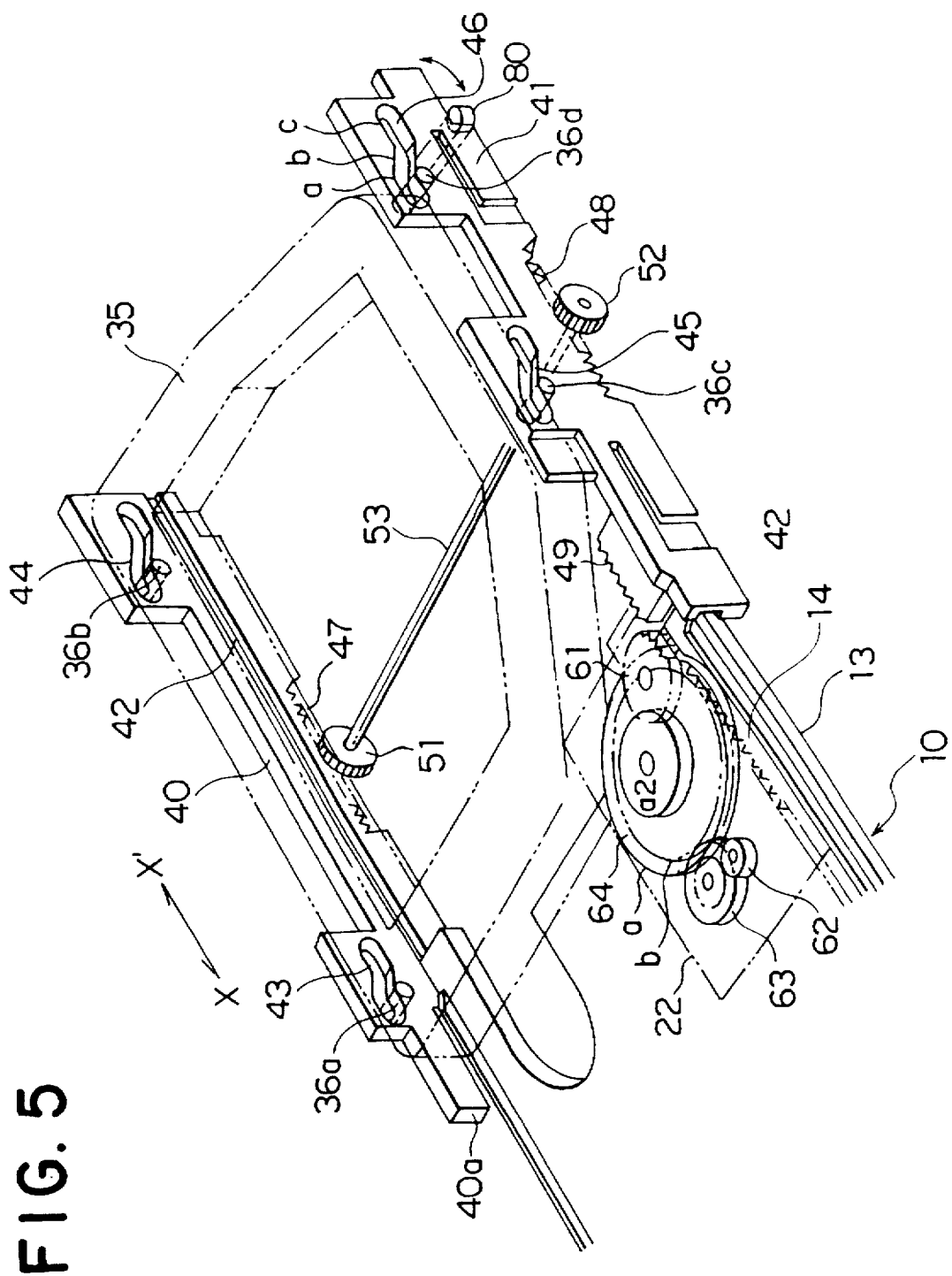
FIG. 5 is a perspective top view showing the linking relation among sliders, a tray, and a PU unit.

As shown in FIG. 5, the sliders 40 and 41 have guide grooves 42 and 42 and guide holes 43, 44, 45, and 46. The guide grooves 42 and 42 fit the slider fitting protrusions 13 and 13 formed on the outer side surfaces of the tray 10 so as to slidably guide the tray 10 in the direction of the arrow X-X'.

Guide pins 36a and 36b and guide pins 36c, and 36d formed on the frame 35 of the PU unit 30 are inserted into the guide holes 43 and 44 and the guide holes 45 and 46, respectively. Since the guide holes fit the corresponding guide pins, the PU unit 30 is lifted up or down along with the sliding operations of the sliders 40 and 41.

Figure 6:
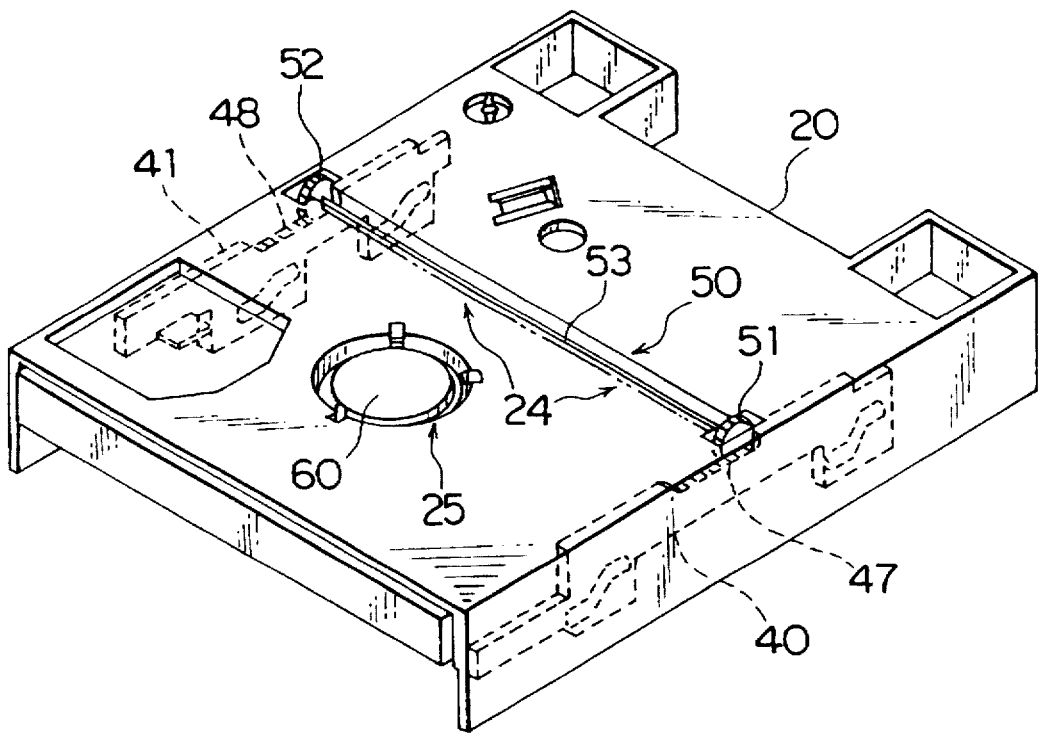
FIG. 6 is a perspective top view showing the optical disc reproducing apparatus shown in FIG. 2.

Rack gears 47 and 48 are formed at the lower edges of the sliders 40 and 41, respectively. As shown in FIG. 6, the rack gears 47 and 48 are engaged with gears 51 and 52 secured at both edges of a shaft 53 of a link member 50. The sliders 40 and 41 are linked by the link member 50 so that the sliders 40 and 41 are synchronously slid. A rack gear 49 is formed on the slider 41.

(Detail description of motion transmission system of loading motor 23)

As shown in FIG. 5, the motor 23 is secured to the motor mount table 22 (see FIGS. 3 and 4) of the frame 20. A motor gear 62 axially secured to the motor shaft of the motor 23 is linked to a clutch gear 64 through an intermediate gear 63.

As shown in FIGS. 7, 8, and 9, the clutch gear 64 is constructed of a second gear a and a first gear b. The second gear a receives the motion of the motor 23 through the gears 63 and 62 (see FIG. 5). A protrusion a1 is formed on the second gear a in such a manner that the protrusion a1 faces the first gear b. A gear a2 that is coaxial to the second gear a is disposed on the other surface of the second gear a. The gear a2 can be linked with the rack gear 49 of the slider 41 through the gear 61.

The first gear b is engaged with the rack gear 14 of the tray 10. A protrusion holder b1 that holds the protrusion a1 of the second gear a is formed in the first gear b. The protrusion holder b1 is formed at the hatched position of FIG. 8. The protrusion holder b1 is formed in an elongate shape extending along the rotating direction of the gear. The protrusion holder b1 is supported by the first gear b through one edge portion in the longitudinal direction thereof. When the rotating load of the first gear b exceeds a predetermined value, the protrusion holder b1 is elastically deformed by the pressure from the protrusion a1.

Next, the operation of the clutch gear 64 will be described.

Figure 10A:
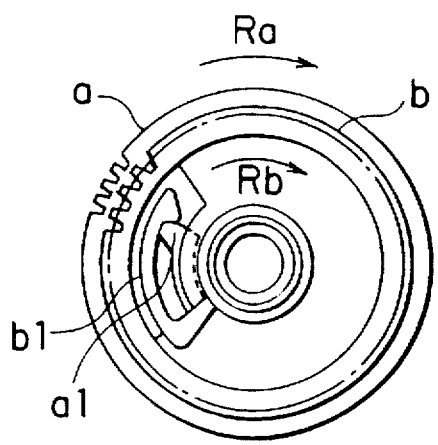
FIGS. 10A to 10C are top views for explaining the operation of the clutch gear.

As shown in FIG. 10A, when the tray 10 is loaded, the second gear a is rotated in the direction of the arrow Ra by the motion of the motor 23. At this point, since the rotating load of the first gear b is only the loading load of the tray 10, the protrusion holder b1 of the first gear b is not elastically deformed. Thus, in this case, since the protrusion holder b1 of the first gear b holds (fits) the protrusion a1 of the second gear a, the first gear b rotates in the same direction (the direction of the arrow Rb) and at the same speed as the second gear a.

When the tray is unloaded, the second gear a is rotated in the reverse direction of the arrow Ra by the motion of the motor 23. In this case, the protrusion a1 is completely fitted to the protrusion holder b1. Thus, the first gear b is rotated in the same direction (in the reverse direction of the arrow Rb) and at the same speed as the second gear a.

Figure 10B:
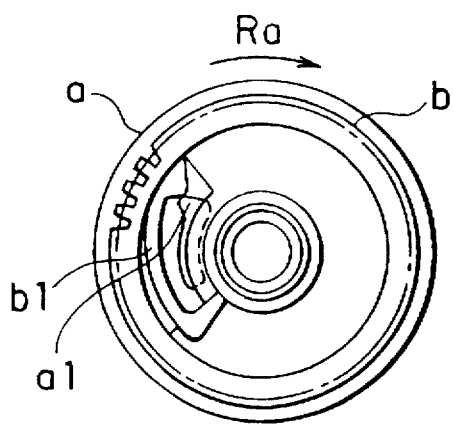

FIG. 10B shows the state of the clutch gear 64 that the tray 10 has just been loaded (moved in the horizontal direction). As described above, the PU unit 30 is continuously lifted up or down after the tray has been loaded. Thus, after the tray has been loaded, the second gear a is rotated in the direction of the arrow Ra by the motion of the motor 23.

On the other hand, the rotation of the first gear b that is engaged with the rack gear 14 of the tray 10 is restricted when the tray 10 has been loaded. Thus, the protrusion holder b1 is elastically deformed by the pressure of the protrusion a1. Consequently, the protrusion a1 is released from the protrusion holder b1. Thereafter, only the second gear a is rotated in the direction of the arrow Ra. The rotation of the second gear a is transmitted to the lifting mechanism of the PU unit through the rack gear 49. Thus, only the lifting operation of the PU unit 30 is continued so that the disc is clamped.

Figure 10C:
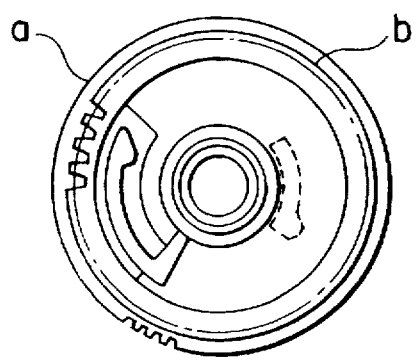

FIG. 10C is a view showing the state of the clutch gear 64 that the PU unit 30 has been lifted. Until this state, only the second gear a is rotated.

(Detail description of disc clamp mechanism)

Figure 11A:
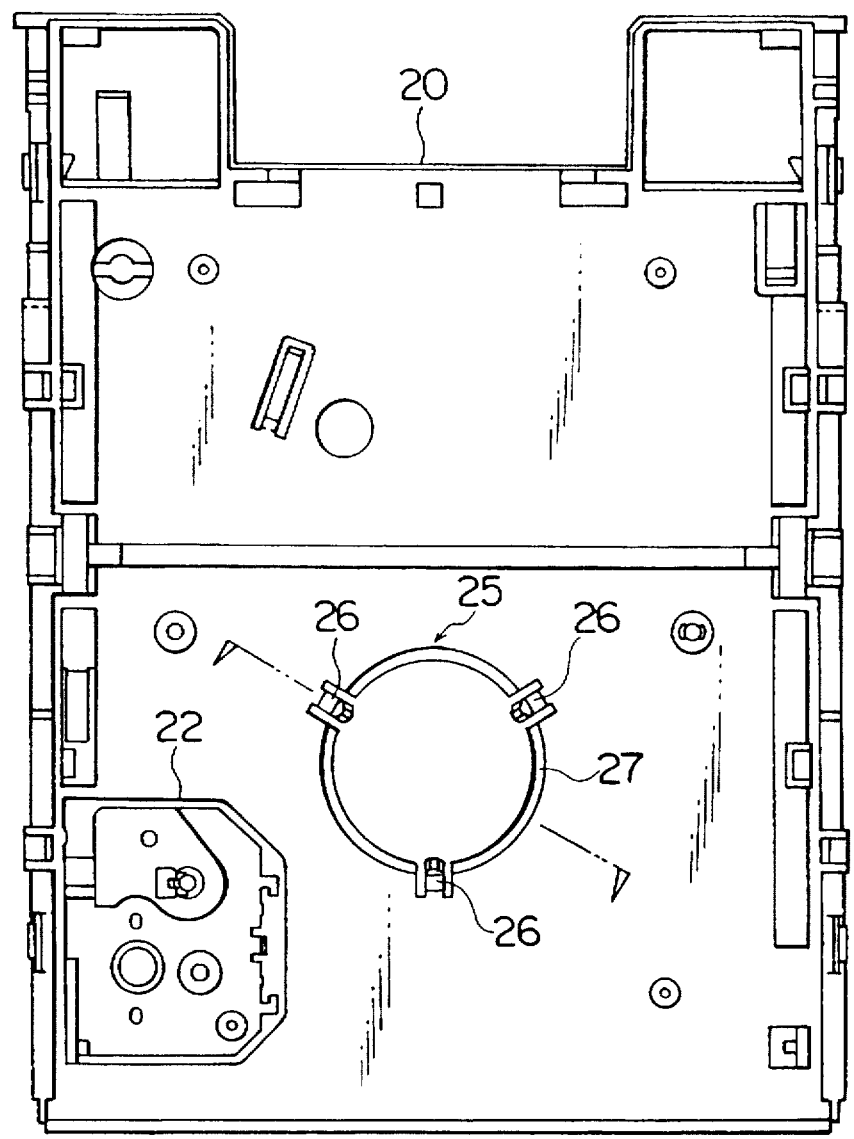
FIG. 11 is a top view and a sectional view showing the construction of a disc clamp mechanism.
Figure 11B:
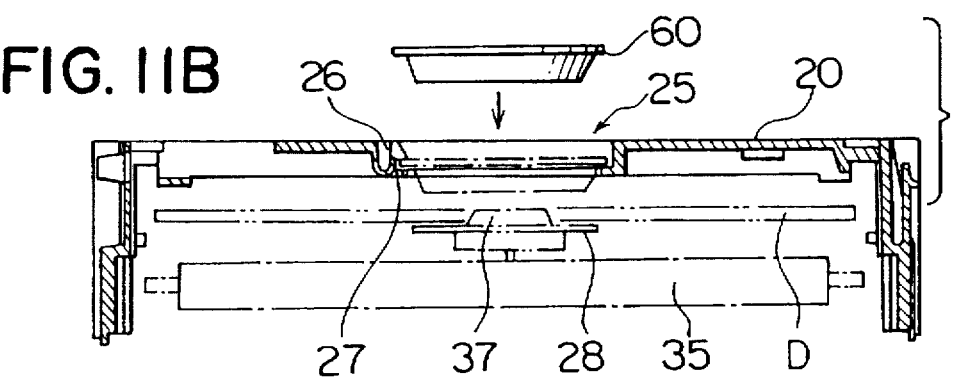

As shown in FIG. 11, the clamper mount portion 25 comprises an opening portion and three nail portions 26, 26, and 26. The clamper 60 fits the opening portion. The three nail portions 26, 26, and 26 hold the clamper 60, which fits the opening portion. The clamper 60 is rotatably held between the three nail portions 26, 26, and 26 and a base 27. Each of the nail portions 26 is constructed of a tapered edge portion and a clamper support surface. The edge portion is elastically deformed by the clamper 60 when it is mounted. The clamper support surface holds the clamper 60 so as to prevent it from dropping. The clamper 60 has a magnet (not shown) that magnetically links to a metal buried in the turn table 28.

(Detail description of disc drive mechanism)

Figure 12:
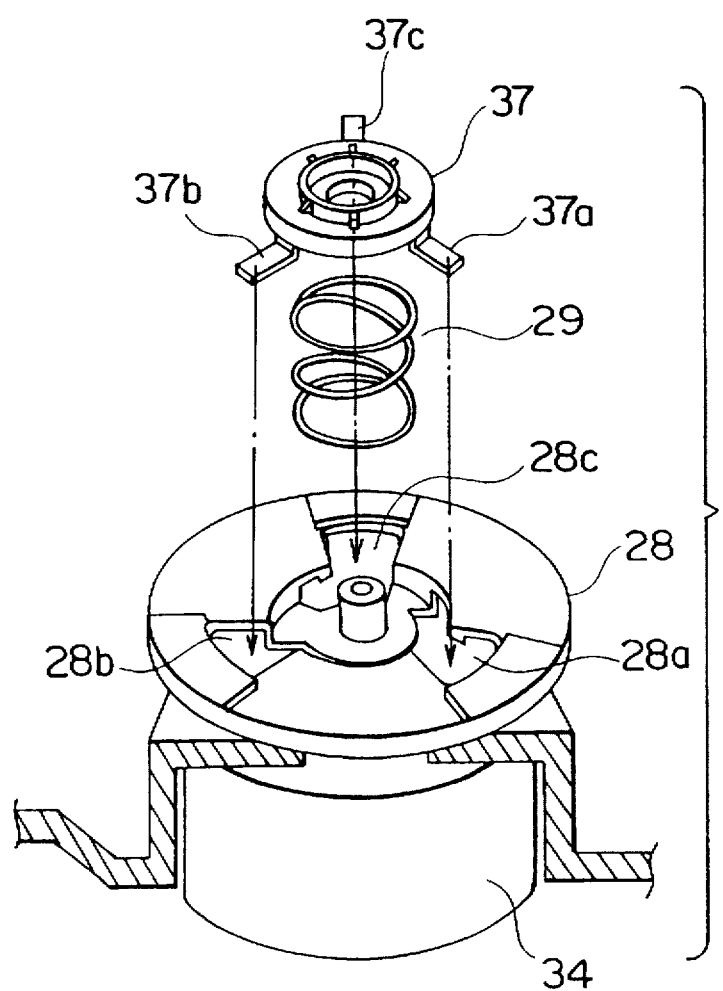
FIG. 12 is an exploded perspective view showing the construction of the disc drive mechanism.

As shown in FIG. 12, the disc drive mechanism comprises the turn table 28, the disc motor 34, and a centering member 37. The disc motor 34 drives the turn table 28. The centering member 37 is disposed on the turn table 28 through a spring 29. The centering member 37 aligns the optical disc D at the center of the turn table 28.

Figure 13A:
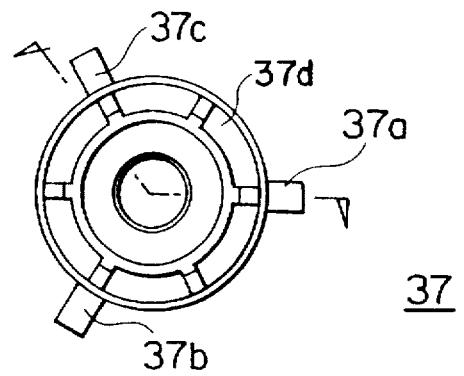
FIG. 13A is a top view and FIG. 13B is a sectional view showing the construction of a centering member of the disc drive mechanism.
Figure 13B:
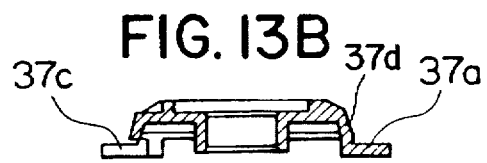

As shown in FIGS. 13A and 13B, the centering member 37 has three protrusion plates 37a, 37b, and 37c that have the same shape. The protrusion plates 37a, 37b, and 37c are disposed around the centering member 37 at equal intervals. The protrusion plates 37a, 37b, and 37c radially protrude from the periphery of a main centering portion 37d of the centering member 37 (in the direction along the surface of the optical disc). The main centering portion 37d has an annular disc centering area which engages and centers the annular edge defining a central aperture in a disc to center the disc on the turntable in conventional fashion.

Figure 14A:
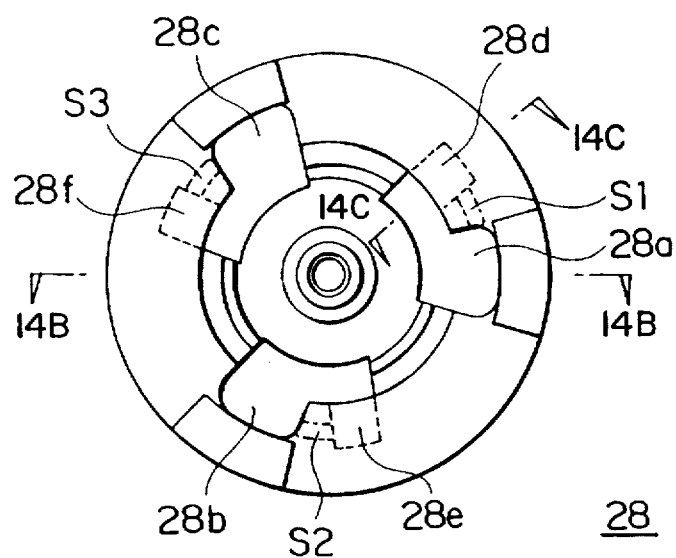
FIG. 14 is a top view and a sectional view showing the construction of a turn table of the disc drive mechanism.
Figure 14B:
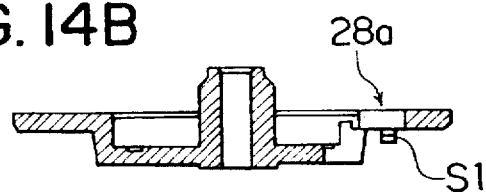
Figure 14C:
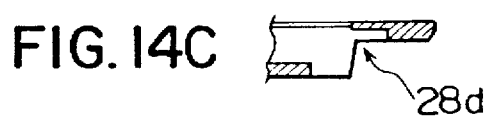

As shown in FIG. 14, the turn table 28 has three insertion holes 28a, 28b, and 28c, hold portions 28d, 28e, and 28f, and stoppers S1, S2, and S3. The protrusion plates 37a, 37b, and 37c of the centering member 37 are inserted into the insertion holes 28a, 28b, and 28c, respectively. The hold portions 28d, 28e, and 28f hold the protrusion plates 37a, 37b, and 37c at predetermined positions of the turn table 28.

Figure 15A:
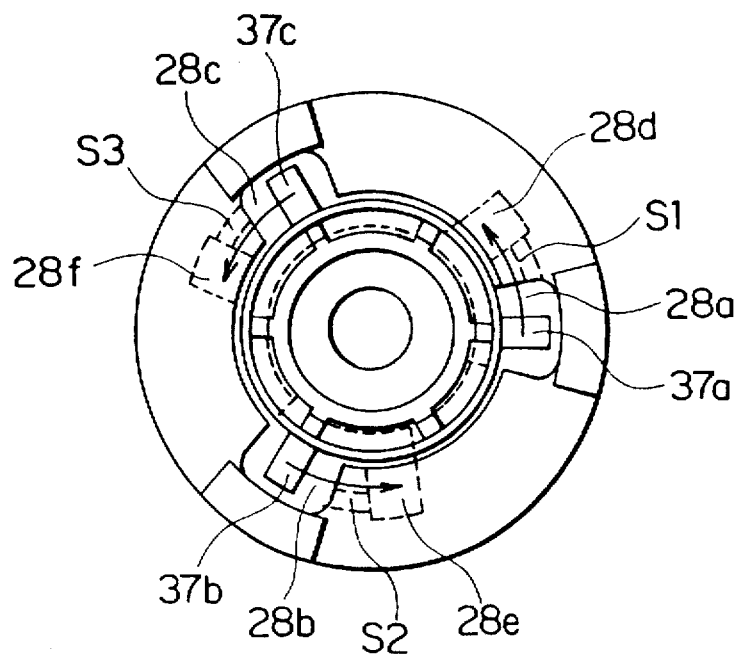
FIGS. 15A and 15B are views for explaining the method for mounting the centering member to the turn table.
Figure 15B:
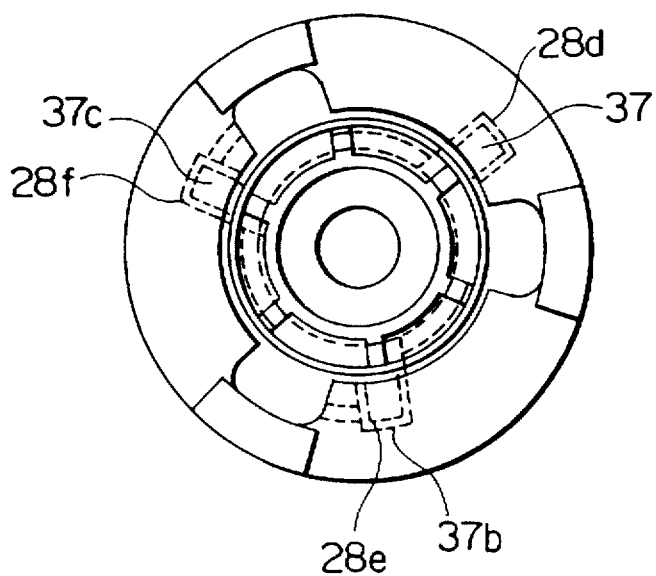

When the centering member 37 is mounted on the turn table 28, as shown in FIG. 15A, the protrusion plates 37a, 37b, and 37c of the centering member 37 are downwardly inserted into the insertion holes 28a, 28b, and 28c of the turn table 28. At this point, the protrusion plates 37a, 37b, and 37c should be inserted into the insertion holes 28a, 28b, and 28c so that the protrusion plates 37a, 37b, and 37c are placed to positions lower than the lower edge surfaces of the stoppers S1, S2, and S3, respectively. Next, as shown in FIG. 15B, the centering member 37 is manually rotated in the direction of the arrow. Thus, the protrusion plates 37a, 37b, and 37c are moved to the positions of the hold portions 28d, 28e, and 28f, respectively. Thereafter, when the centering member 37 is released, it is raised by the tension of the spring 29. Thus, the protrusion plates 37a, 37b, and 37c of the centering member 37 fit the hold portions 28d, 28e, and 28f of the turn table 28, respectively. In this state, the rotations and the movements of the protrusion plates 37a, 37b, and 37c of the centering member 37 to the positions of the insertion holes 28a, 28b, and 28c are restricted by the stoppers S1, S2, and S3, respectively. Thus, the centering member 37 is mounted to the turn table 28.

(Detail description of synchronous check structure of sliders 40 and 41)

Next, with reference to FIGS. 6 and 16, a synchronous check structure of the sliders 40 and 41 of the disc reproducing apparatus will be described. As described above, the sliders 40 and 41 are linked through the link member 50. Thus, the slide operations of the sliders 40 and 41 are synchronized. In this structure, when the sliders 40 and 41 are linked through the link member 50, the sliders 40 and 41 should be disposed at horizontally symmetrical positions.

To cause the sliders 40 and 41 to be easily lined through the link member 50, the optical disc reproducing apparatus has holes 40b and 41a (that are formed at horizontally symmetrical positions of the sliders 40 and 41) and check windows 20d and 20d (formed on both walls 201 and 202 of the frame 20). The check windows 20a and 20a are formed so that they match the holes 40b and 41b of the sliders 40 and 41 when they are placed at their normal positions. Thus, when the link member 50 is mounted in such a manner that the holes 40b and 41b of the sliders 40 and 41 are aligned to the positions of the check windows of the frame 20, the assembling work can be precisely performed.

(Detail description of tray loading operation)

Next, the loading operation for the tray 10 and the lifting operation for the PU unit 30 will be described.

Figure 18:
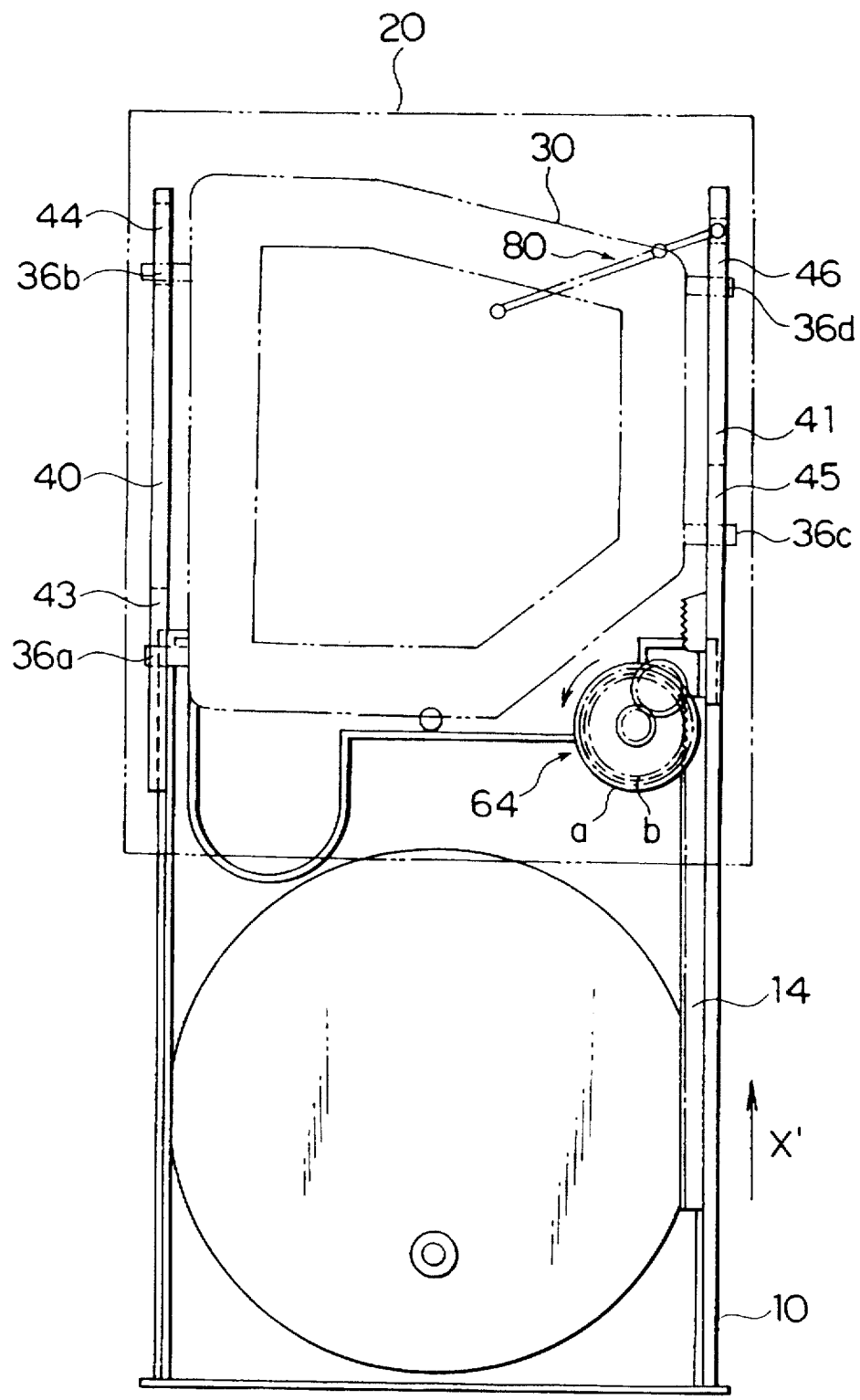
FIG. 18 is a plan view showing the state that the tray is being loaded.

FIGS. 17A and 18 show the state that the tray 10 has been unloaded. As shown in FIGS. 17A and 18, when the tray 10 has been unloaded, the guide pins 36a, 36b, 36c, and 36d of the PU unit are placed at upper horizontal portions a of the guide holes 43, 44, 45, and 46 on the sliders 40 and 41. At this point, the turn table 28 is separated from the clamper 60. On the other hand, as shown in FIG. 18, the rack gear 14 on the tray 10 is linked to the first gear b of the clutch gear 64.

When the tray 10 is manually pushed in the direction of the arrow X', the tray 10 is loaded. When the tray 10 is moved for a predetermined distance, the movement of the tray 10 is electrically detected by a switch 70 disposed on the frame 20. The resultant signal is sent to a controller. Thus, the controller causes the loading motor 23 to start. When the motor 23 starts, the clutch gear 64 rotates in the direction of the arrow. Thus, the tray 10 is automatically loaded.

Figure 19:
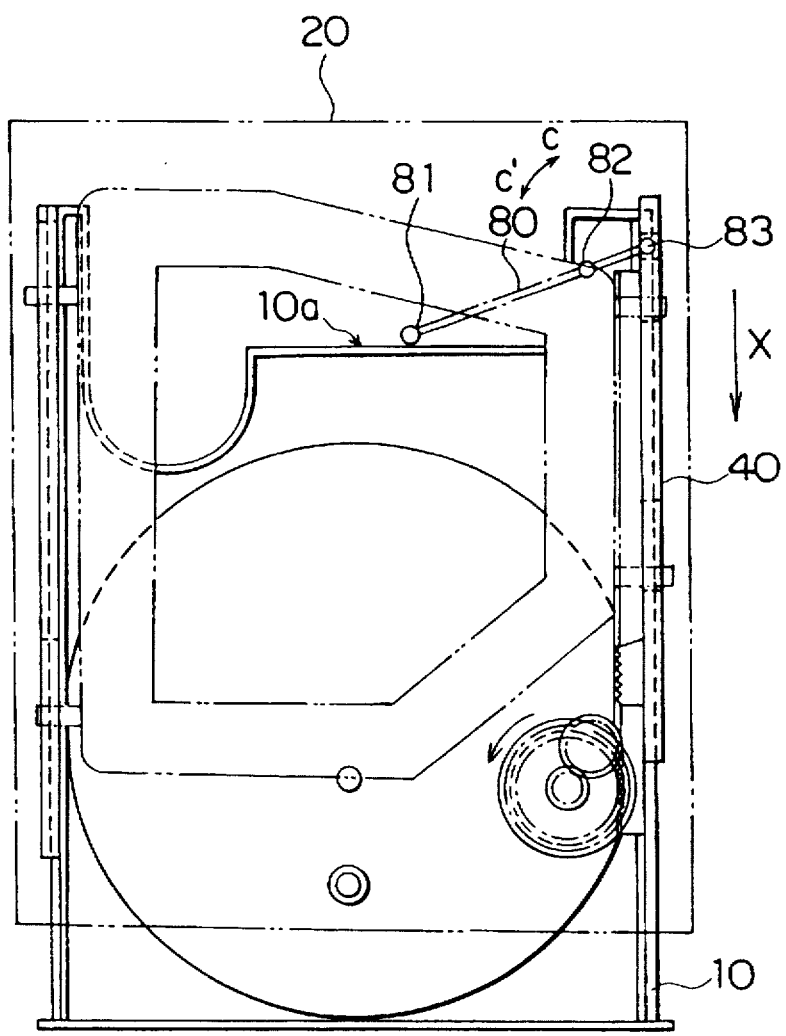
FIG. 19 is a plan view showing the state that the tray has been loaded.

When the loading amount of the tray 10 exceeds a predetermined distance, as shown in FIG. 19, an edge surface 10a on the insertion side of the tray 10 comes in contact with an edge portion 81 of a rotating lever 80. As shown in FIGS. 4 and 5, the rotating lever 80 is rotatably supported on the frame through a shaft 82. The rotating lever 80 has another edge portion 83 that causes the slider 40 to be pushed on the front surface side (in the direction of the arrow X). Thus, the edge portion 81 of the rotating lever 80 comes in contact with the edge surface 10a on the insertion side of the tray 10 and thereby the rotating lever 80 rotates in the direction of the arrow C. Consequently, the slider 40 slides to the front surface side (in the direction of the arrow X). When the slider 40 moves, the other slider 41 linked to the slider 40 through the link member 50 slides in the direction of the arrow X in synchronization with the slider 40.

Figure 20:
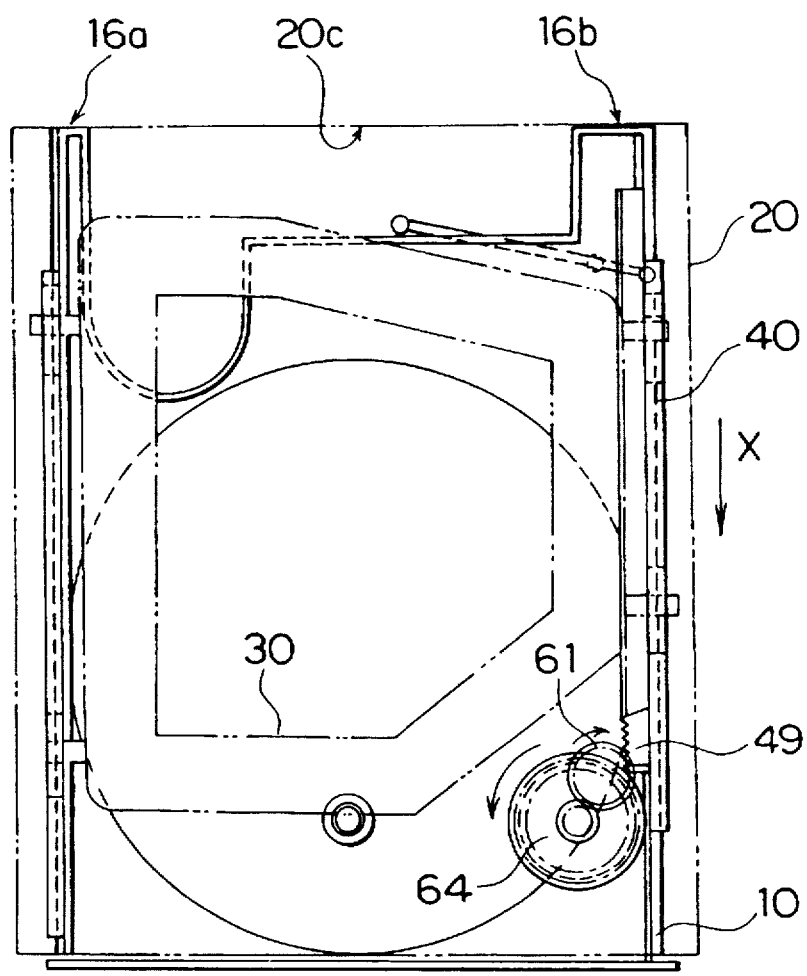
FIG. 20 is a plan view showing the state that the disc has been loaded and clamped.

As shown in FIG. 20, when the edge surfaces 16a and 16b of the tray 10 come in contact with a surface 20c of the frame 20, the loading operation of the tray 10 is completed. At this point, as shown in FIG. 17B, the guide pins 36a, 36b, 36c, and 36d of the PU unit 30 are placed at slope portions b of the guide holes 43, 44, 45, and 46 of the sliders 40 and 41. In other words, the PU unit 30 is placed almost in the middle of the lifting range.

At this point, as shown in FIG. 20, the rack gear 49 of the slider 40 has been linked to the gear 61. Thus, the sliders 40 and 41 are moved in the direction of the arrow X by the motion of the loading motor 23 through the clutch gear 64, the gear 61, and the rack gear 49. At this point, as described above, the motion of the motor 23 to the tray loading mechanism is disconnected by the clutch 64. Thus, the motion is transmitted to only the lifting mechanisms of the sliders 40 and 41.

Figure 21:
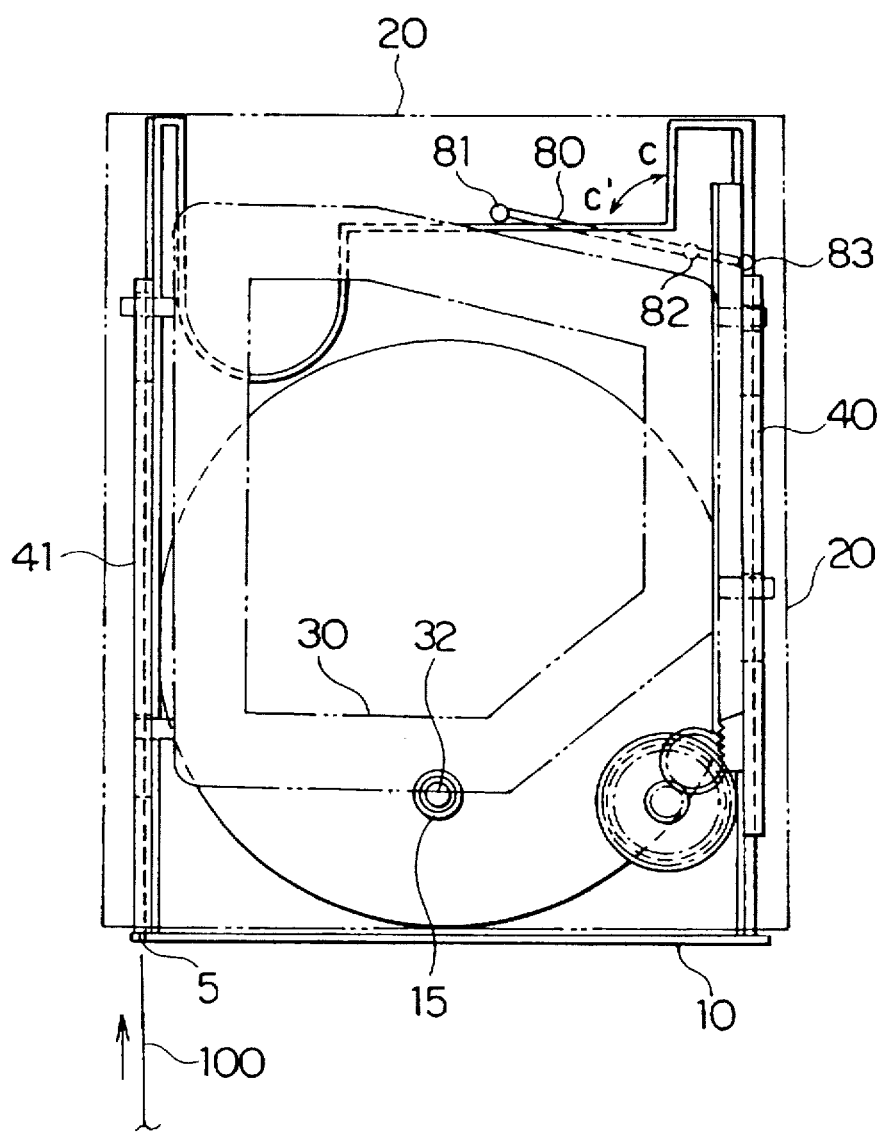
FIG. 21 is a plan view for explaining a synchronous check structure of each slider.
Figure 22:
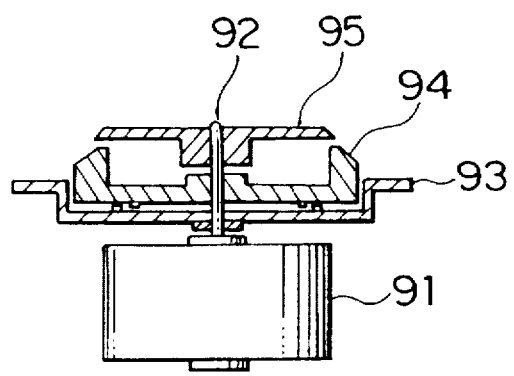
FIG. 22 is a sectional view showing the construction of a conventional disc drive mechanism.
Figure 23:
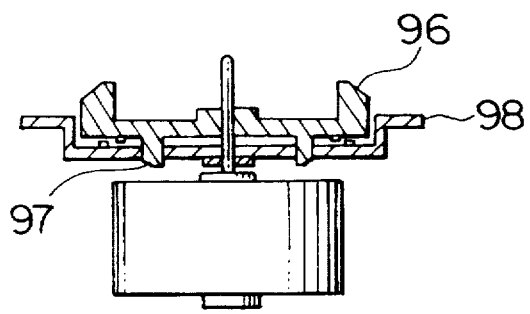
FIG. 23 is a sectional view showing the construction of another conventional disc drive mechanism.

FIG. 21 is a plan view showing the state that the sliders 40 and 41 have been moved (namely, the disc has been loaded). At this point, as shown in FIG. 17C, the guide pins 36a, 36b, 36c, and 36d of the PU unit 30 are placed at lower horizontal portions c of the guide holes 43, 44, 45, and 46 of the sliders 40 and 41, respectively. At this point, the optical disc is clamped between the turn table 28 and the damper 60. The fixing pin 32 on the PU unit 30 fits the pin hole 15 of the tray 10. Thus, the tray 10 and the PU unit 30 are horizontally and vertically aligned and secured.

When the eject switch 4 is pressed, the tray 10 is unloaded. When the controller receives an eject detection signal of the eject switch 4, it causes the loading motor 23 to rotated in the reverse direction of the loading operation. Thus, the PU unit 30 is moved from a position (height) shown in FIG. 17C to a position (height) shown in FIG. 17B and thereby the disc is unclamped. Thereafter, the tray 10 is unloaded in the reverse operation of the above-described loading operation. When the tray 10 has been unloaded to a predetermined position, the switch on the frame 20 electrically detects that the tray 10 has been unloaded. When the controller 70 receives the detection signal from the switch 70, it causes the motor 23 to stop.

Next, a forced unloading operation for forcedly unloading the tray 10 from the cabinet 1 in case of a trouble of the loading mechanism including the loading motor 23 will be described.

As shown in FIG. 1, a hole 5 into which a needle or the like is inserted is formed in the front panel 2. As shown in FIG. 2, a needle 100 inserted into the hole 5 comes in contact with an edge surface 40a of the slider 40. When the needle 100 is strongly pushed, the sliders 40 and 41 slide in the direction of the arrow X'. Thus, the PU unit 30 is lifted up. Thus, when the slider 41 is moved in the direction of the arrow X', as shown in FIG. 21, the rotating lever 80 is rotated in the direction of the arrow C'. Thus, the tray 10 is pushed to the front surface side of the apparatus. At this point, since the fixing pin 32 of the PU unit 30 is separated from the pin hole 15 of the tray 10, it can be manually pulled out.

As described above, in the optical disc reproducing apparatus, by inserting the three protrusion plates 37a, 37b, and 37c formed around the centering member 37 into the three insertion holes 28a, 28b, and 28c formed in the turn table 28 and then slightly rotating the centering member 37, the assembling of the disc drive mechanism is completed. Thus, according to the present invention, the disc reproducing apparatus of which the disc drive mechanism can be thinly constructed and easily assembled can be provided.

Although the present invention has been shown and described with respect to a best mode embodiment thereof, it should be understood by those skilled in the art that the foregoing and various other changes, omissions, and additions in the form and detail thereof may be made therein without departing from the spirit and scope of the present invention.

What is claimed is:

1. A disc reproducing apparatus, comprising:
   a turntable for holding and rotating a disc, said turntable having an upper surface with a plurality of hole portions formed therein;
   a motor for driving said turntable;
   a centering member for receiving a center hole of the disc so as to align the disc with the center of said turntable, said centering member including a plurality of radially extending protrusion portions formed thereabout, said protrusion portions being constructed and arranged to secure said centering member to said turntable, said protrusion portions capable of being simultaneously inserted into the hole portions in the upper surface of said turntable and moved about the center of said centering member for a predetermined angle upon rotation of the centering member; and
   a securing structure constructed and arranged to secure said protrusion portions of said centering member inserted into the hole portions of said turntable after the centering member is rotated to thereby secure said centering member to said turntable, said securing structure including:
   (i) a plurality of stoppers formed adjacent to the hole portions of said turntable and projecting downwardly with respect to said upper surface of said turntable, said stoppers being adapted to engage said protrusion portions to thereby prevent said protrusion portions from reversely rotating and aligning with said hole portions after said centering member is secured to said turntable; and
   (ii) an elastic member for elastically supporting said centering member on said turntable, said elastic member biasing said protrusion portions which have been inserted and moved in the hole portions towards a position in which said protrusion portions are axially aligned with said stoppers, said elastic member maintaining said protrusion portions aligned with said stoppers so that said stoppers prevent said protrusion portions from reversely rotating and aligning with said hole portions.

2. The disc reproducing apparatus as set forth in claim 1, wherein said protrusion portions each have the same shape and are formed around said centering member at circumferentially spaced equal intervals.

3. The disc reproducing apparatus as claimed in claim 1, wherein said centering member has a main centering portion having an annular disc centering area constructed and arranged to engage and center an annular edge defining a central aperture in said disc so as to center the disc on said turntable, said protrusion portions extending radially outwardly beyond a radial extent of said disc centering area.

4. A disc reproducing apparatus, comprising:

a turntable for holding and rotating a disc, said turntable having an upper surface with a plurality of hole portions formed therein;

a motor for driving said turntable;

centering means for receiving a center hole of the disc so as to align the disc with the center of said turntable, said centering means including a plurality of radially extending protrusion portions formed thereabout, said protrusion portions being constructed and arranged to secure said centering means to said turntable, said protrusion portions capable of being simultaneously inserted into the hole portions in the upper surface of said turntable and moved about the center of said centering means for a predetermined angle upon rotation of the centering means; and securing means constructed and arranged secure said protrusion portions of said center means inserted into the hole portions of said turntable after the centering means is rotated to thereby secure said centering means to said turntable, said securing means including:

(i) a plurality of stoppers formed adjacent to the hole portions of said turntable and projecting downwardly with respect to said upper surface of said turntable, said stoppers being adapted to engage said protrusion portions to thereby prevent said protrusion portions from reversely rotating and aligning with said hole portions after said centering member is secured to said turntable; and an elastic member for elastically supporting said centering means on said turntable, said elastic member biasing said protrusion portions which have been inserted and moved in the hole portions toward a position in which said protrusion portions are axially aligned with said stoppers, said elastic member maintaining said protrusion portions aligned with said stoppers so that said stoppers prevent said protrusion portions from reversely rotating and aligning with said hole portions.

5. The disc reproducing apparatus as claimed in claim 4, wherein said centering means has a main centering portion having an annular disc centering area constructed and arranged to engage and center an annular edge defining a central aperture in said disc so as to center the disc on said turntable, said protrusion portions extending radially outwardly beyond a radial extent of said disc centering area.

* * * * *

UNITED STATES PATENT AND TRADEMARK OFFICE
CERTIFICATE OF CORRECTION

PATENT NO. : 5,796,709
DATED : August 18, 1998
INVENTOR(S) : Makoto OOTSUKA

It is certified that error appears in the above-identified patent and that said Letters Patent is hereby corrected as shown below:

On the title page, item [54], change

"DISK REPRODUCTING APPARATUS HAVING IMPROVED CONNECTION BETWEEN THE CENTERING MEMBER AND TURNTABLE" to --[54] DISC REPRODUCING APPARATUS HAVING IMPROVED CONNECTION BETWEEN THE CENTERING MEMBER AND TURNTABLE--.

Signed and Sealed this

Seventh Day of December, 1999

Attest:

Attesting Officer

Q. TODD DICKINSON

Acting Commissioner of Patents and Trademarks